(12) United States Patent
Picou et al.

(10) Patent No.: US 12,199,960 B2
(45) Date of Patent: Jan. 14, 2025

(54) SYSTEMS AND METHODS FOR SOFTWARE TELEMETRY PIPELINE AGENT

(71) Applicant: Rockwell Automation Technologies, Inc., Mayfield Heights, OH (US)

(72) Inventors: David Picou, Chagrin Falls, OH (US); Francisco P. Maturana, Lyndhurst, OH (US); Jay W. Schiele, Union Grove, WI (US); Krutika Kansara, Bangalore (IN); Nikhil Ashok Patange, Pune (IN); Larry D. Armstrong, Cleveland, OH (US); Kerwen Changyuan Zhang, Dalian (CN); John L. Kelly, Twinsburg, OH (US); Davis Biao Ma, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 344 days.

(21) Appl. No.: 17/729,065

(22) Filed: Apr. 26, 2022

(65) Prior Publication Data

US 2023/0344810 A1    Oct. 26, 2023

(51) Int. Cl.
*H04L 9/40* (2022.01)
(52) U.S. Cl.
CPC ................... *H04L 63/0464* (2013.01)
(58) Field of Classification Search
CPC .................................................. H04L 63/0464
USPC ......................................................... 713/153
See application file for complete search history.

(56) References Cited

U.S. PATENT DOCUMENTS

| | | | | |
|---|---|---|---|---|
| 6,963,972 | B1* | 11/2005 | Chang | H04L 63/12 713/153 |
| 2003/0055552 | A1* | 3/2003 | Akins | F02D 41/2493 701/114 |
| 2009/0177698 | A1 | 7/2009 | Chan et al. | |
| 2015/0123767 | A1* | 5/2015 | Tolle | G06F 21/31 340/5.85 |
| 2017/0103632 | A1* | 4/2017 | Tolle | H04W 12/06 |
| 2018/0287893 | A1 | 10/2018 | O'Brien et al. | |
| 2022/0101269 | A1* | 3/2022 | Mehrotra | G06Q 10/00 |

OTHER PUBLICATIONS

Extended European Search Report for Application No. 23168925.8 mailed Sep. 11, 2023, 9 pages.

* cited by examiner

*Primary Examiner* — Michael S McNally
(74) *Attorney, Agent, or Firm* — Fletcher Yoder, P.C.

(57) ABSTRACT

A non-transitory computer readable medium stores instructions that, when executed by a processor, cause the processor to receive, from one or more processing nodes, data representative of usage and inventory of one or more software assets by one or more industrial automation devices of an industrial automation system that are communicatively coupled to the one or more processing nodes, determining a data delta for the industrial automation system that represents differences between the software asset data and a previous iteration of the software asset data, encrypt the data delta for the industrial automation system, and transmit the encrypted data delta for the industrial automation system to a remote server.

9 Claims, 8 Drawing Sheets

SYSTEMS AND METHODS FOR SOFTWARE TELEMETRY PIPELINE AGENT

BACKGROUND

The present disclosure generally relates to software used by industrial automation devices. More specifically, the present disclosure relates to tracking and managing software asset usage by industrial automation devices.

Industrial automation systems may be used to provide automated control of one or more actuators in an industrial setting. These industrial automation systems may utilize software and/or services during operation. Typically, components of an industrial automation system operate on a private network such that communication of components within the private network with devices that are outside of the private network is limited or prohibited. Accordingly, tracking usage of the software and/or services by the industrial automation system and managing licenses for the software and/or services can be difficult. It may be desirable to develop techniques for managing software licensing and usage by industrial automation system within private networks.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by a processor of a first node, cause the processor to receive, from one or more additional nodes, software asset data representative of usage and inventory of one or more software assets by one or more industrial automation devices of an industrial automation system that are communicatively coupled to the one or more secondary nodes, consolidate the received software asset data into a data delta store for the industrial automation system that represents differences between the new software asset data and a previous iteration of the software asset data, encrypt the data delta for the industrial automation system, and transmit the encrypted data delta for the industrial automation system to a remote server, referred to herein as telemetry. As used herein, data may become telemetry when the data transitions form being stored on premises (e.g., in an encrypted form) to an off-premises remote server. However, other embodiments are envisaged in which data becomes telemetry at other places in the data flow.

In another embodiment, a method includes receiving, at a first node, from one or more industrial automation devices communicatively coupled to the first node, software asset data representative of usage of one or more software assets by the one or more industrial automation devices of an industrial automation system, generating, by the first node, based on the received software asset data, a data delta representative of differences between the software asset data and a previous iteration of the software asset data, encrypting, by the first node, the data delta, transmitting the encrypted data delta from the first node to a second node that is in a primary node role, decrypting, by the second node, the data delta, consolidating, by the second node, the decrypted data delta and additional decrypted data delta received from the one or more additional nodes into consolidated data delta for the industrial automation system, encrypting, by the second node, the consolidated data delta for the industrial automation system, and transmitting, with telemetry by the second node, the encrypted consolidated data delta for the industrial automation system to a remote server.

In another embodiment, a non-transitory computer readable medium stores instructions that, when executed by a processor of a first node, cause the processor to receive, from one or more industrial automation devices communicatively coupled to the first node, software asset data representative of usage of one or more software assets by the one or more industrial automation devices, generate, via the processor and based on the received software asset data, a data delta representative of differences between the software asset data and a previous iteration of the software asset data, encrypt the data delta via the processor, and transmit, via the processor, the encrypted data delta to a second node that is in a primary node role. The delta data algorithm ensures that no data is lost or transmitted twice.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure includes techniques for tracking software asset usage and managing software licenses for an industrial automation system. The industrial automation system may be disposed within a private network and may include multiple nodes having internet connections. A first node may be assigned a role of primary node, while the remaining nodes may be assigned the role of secondary node. The internet connection of the primary node may be enabled, while the internet connections of the secondary nodes may be disabled. The nodes collect software artifacts representative of usage of software assets by connected industrial automation devices. Telemetry pipeline agents (TPAs) of the nodes determine a data delta that represents differences between the software artifacts and a previous iteration of the software artifacts and manage a local data delta folder. The TPAs periodically aggregate data delta folders and transmit the data deltas to the TPA of the primary node, which consolidates the received data deltas into a single data delta representation for the entire industrial automation system. The TPA of the primary node then uploads the single data delta representation (e.g., telemetry data) to a remote server for analysis by the customer and/or software provider. Further, the network topology described below may be self-healing, in that the system can identify when a node and/or a registry has failed and take corrective action to maintain the flow of telemetry data. For example, if the primary node fails, the role of primary node will be shifted to the next available secondary node with an internet connection. The most recent data delta for the whole system is provided to the new primary node, the TPAs of the secondary nodes are instructed to redirect data deltas to the new primary node, and the process resumes as normal with the new primary node. If the primary registry fails, a backup copy of the registry, which is maintained using synched metadata from the primary registry, is initialized and assumes the role of primary registry. All TPAs are notified of the new primary registry and the process resumes as normal with the new primary registry. Additional details with regard to managing software asset licensing and usage in accordance with the techniques described above will be provided below with reference to FIGS. 1-8.

Figure 1:
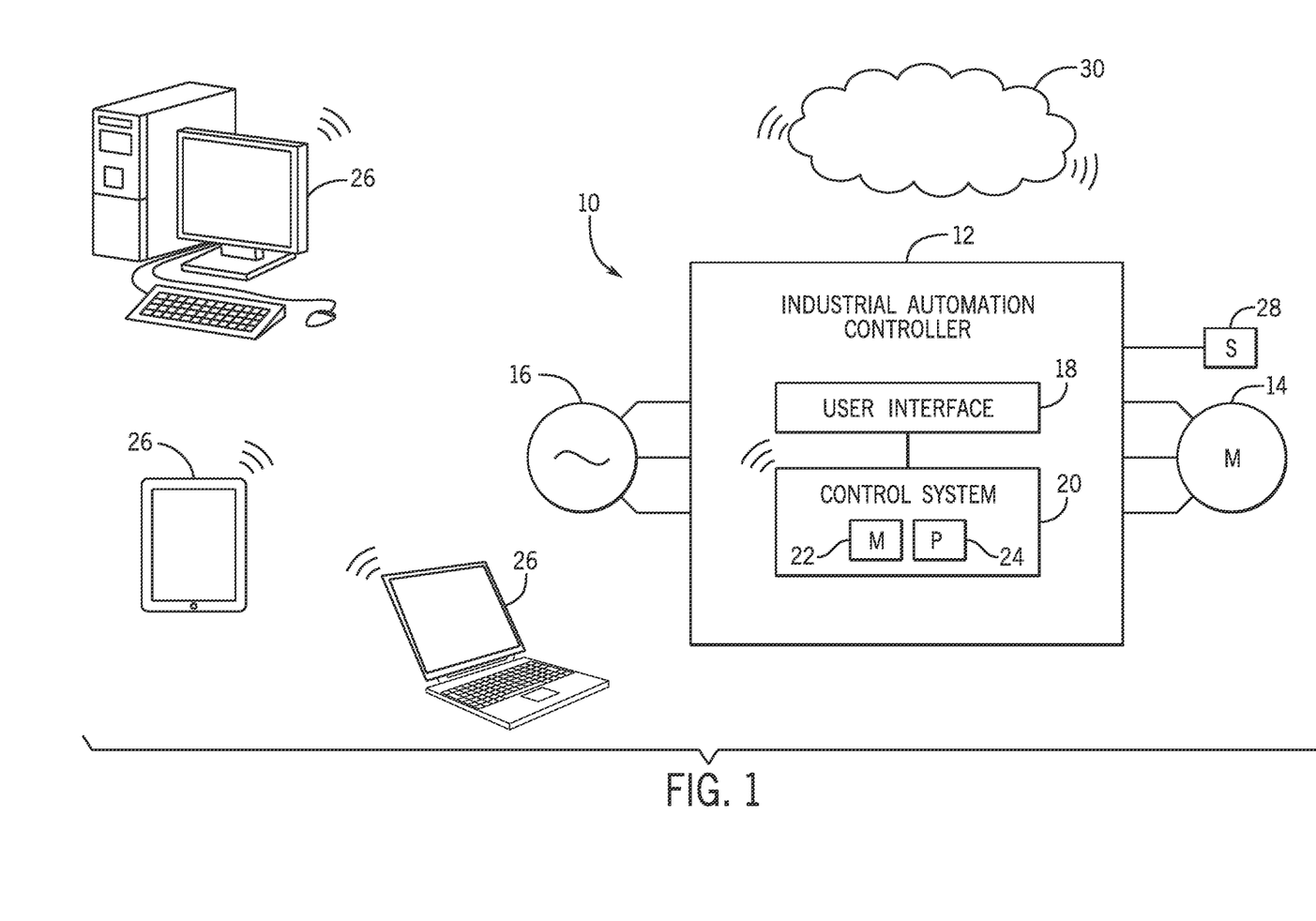
FIG. 1 illustrates a schematic view of an industrial automation system, including a controller, a computing device, and a remote server, in accordance with embodiments presented herein.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through licensed software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis (e.g., via licensed software or paid services).

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. As previously discussed, the controller 12 may collect feedback data during execution of the project, and the feedback data may be provided back to the computing device 26 for analysis by one or more licensed software and/or subscription services. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
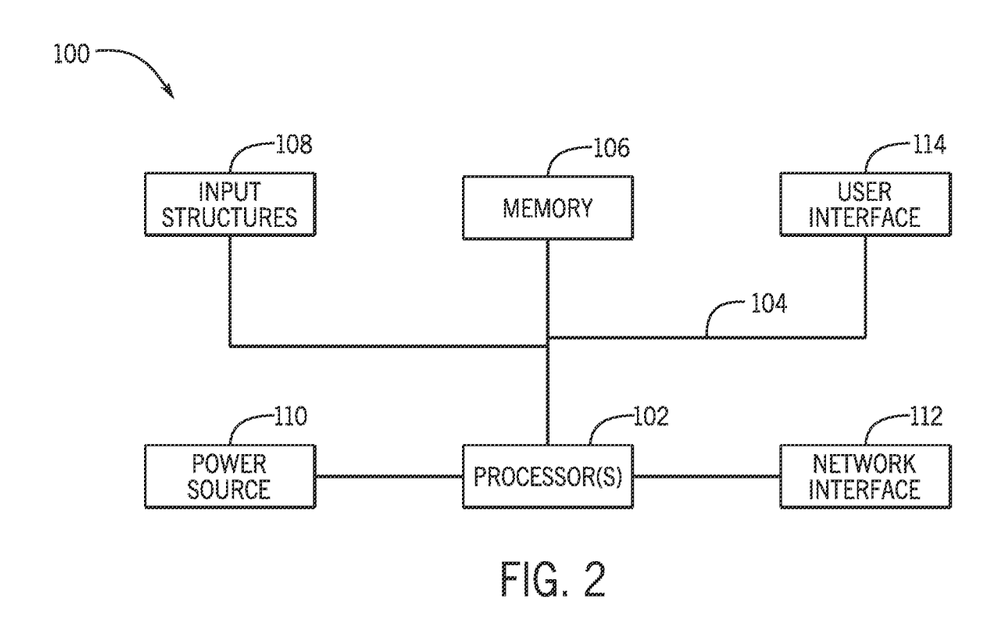
FIG. 2 illustrates a block diagram of example components that could be used as the controller, the computing device, and/or the remote server of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 112, a power source 114, a network interface 116, a user interface 118, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 112 may allow a user to input data and/or commands to the device 100 and may include mice, touchpads, touchscreens, keyboards, controllers, and so forth. The power source 114 can be any suitable source for providing power to the various components of the computing device 100, including line and battery power. In the depicted example, the device 100 includes a network interface 116. Such a network interface 116 may allow communication with other devices on a network using one or more communication protocols. In the depicted example, the device 100 includes a user interface 118, such as a display that may display images or data provided by the one or more processors 102. The user interface 118 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Returning to FIG. 1, an enterprise may utilize licensed software and/or subscription services running on the computing device 26 or the controller 12, in design of the industrial automation system 10, operation of the industrial automation system 10, and/or analysis of the industrial automation system 10. Accordingly, the enterprise may wish to track its usage of the licensed software and/or subscription services and/or manage its licenses. However components of the industrial automation system 10 may operate on a private network such that communication of components within the private network with devices that are outside of the private network is limited or prohibited. Accordingly, tracking usage of the software and/or services by the industrial automation system and managing licenses for the software and/or services can be difficult.

Figure 3:
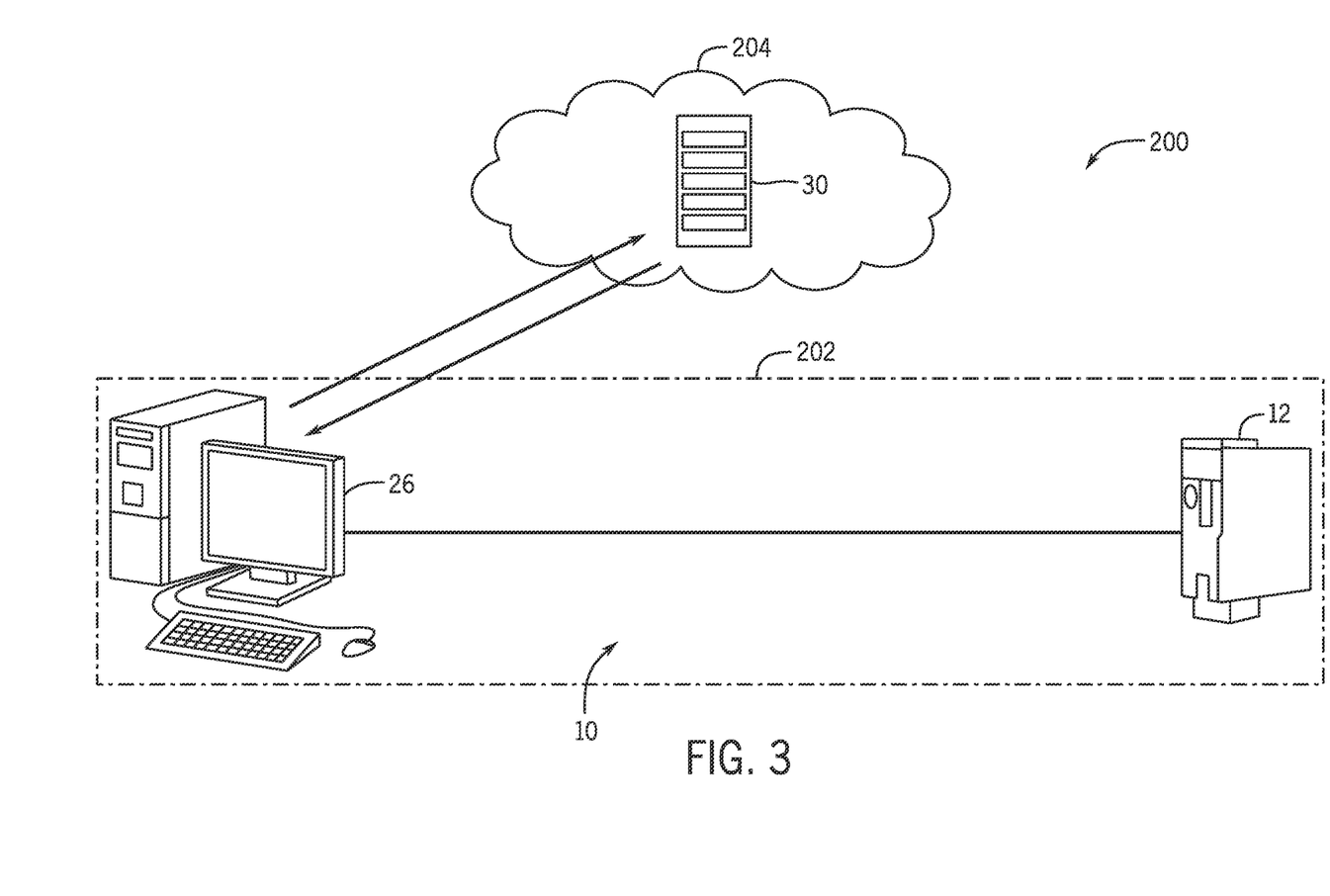
FIG. 3 illustrates a schematic of a system for providing software, firmware, and/or services to one or more components of the industrial automation system of FIG. 1, in accordance with embodiments presented herein.

With the preceding in mind, FIG. 3 illustrates a schematic of a system 200 for providing software, firmware, or services to one of more components (e.g., the industrial automation controller 12, the computing device 26, etc.) of an industrial automation system 10. As shown, the industrial automation system 10 is disposed within a private network 202. The private network 202 may be connected to public networks in a secure way with firewalls or Air-Gapped with no network connection other than special file transfer via physical media. The remote server 30 may be disposed in a public network 204 (e.g., the internet). Devices within the private network 202 may not be reachable by devices within the public network 204, but devices within the public network 204 may be reachable by devices within the private network 202 on a continuous basis through firewalls or intermittently via periodic transfer of files with physical media. Accordingly, the computing device 26 may establish a connection with the remote server 30 and exchange data with the remote server 30.

After a connection is established between the computing device 26 and the remote server 30, the computing device 26 may periodically collect software data regarding software and/or service usage by devices on the private network 202, consolidate the collected software data and transmit software telemetry data to the remote server 30. Further, the computing device 26 may receive software data about licenses and/or permitted software/service use from the remote server 30. In some embodiments, the computing device 26 may also receive software/firmware updates from the remote server 30. The computing device 26 may distribute received software data to various devices (e.g., the industrial automation controller 12) within the industrial automation system 10.

Figure 4:
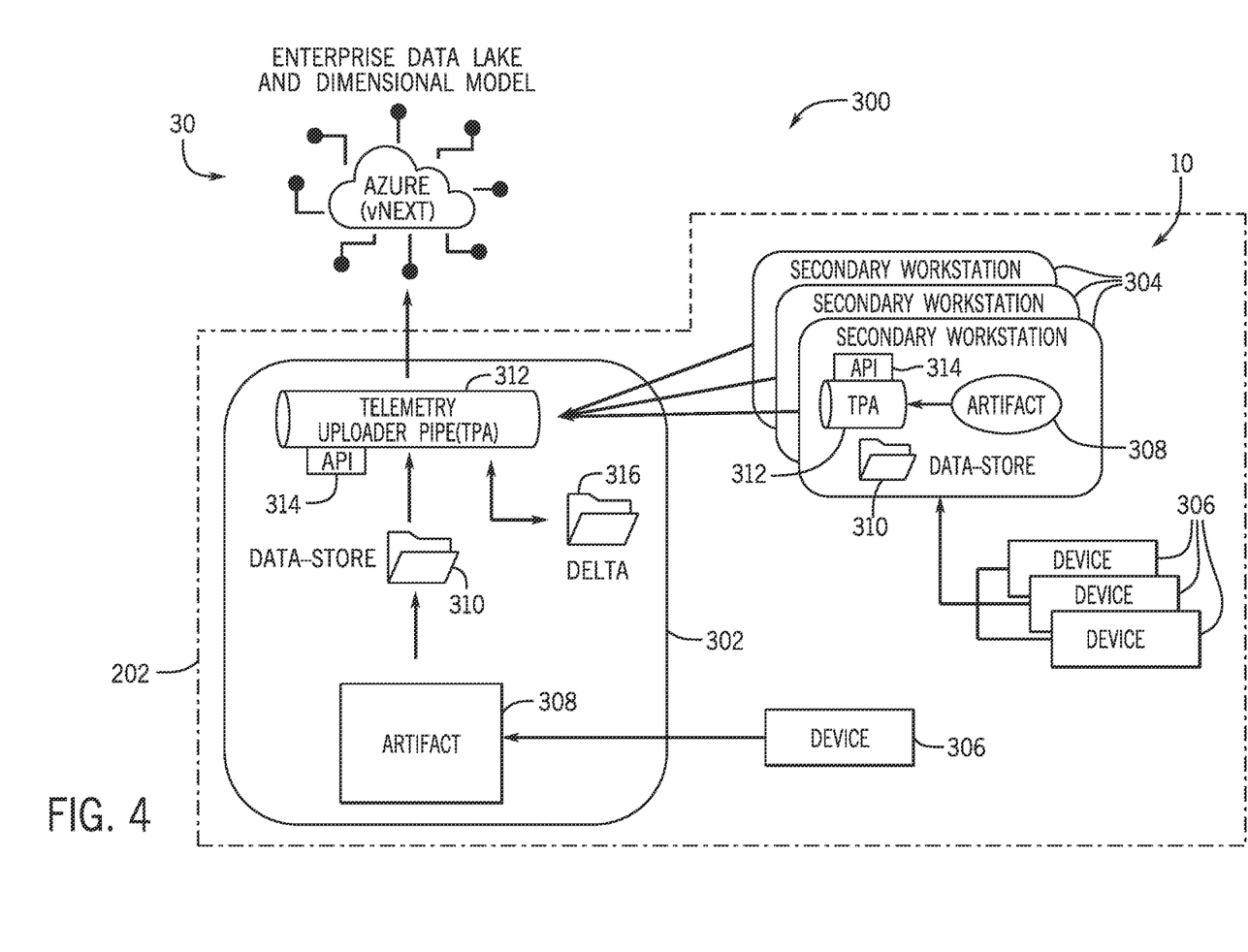
FIG. 4 illustrates a network topology for managing software asset licensing and usage in the industrial automation system of FIG. 1, including a primary node and multiple secondary nodes, each having respective telemetry pipeline agents (TPAs), in accordance with aspects of the present disclosure.

FIG. 4 illustrates a network topology 300 for managing software asset licensing and usage in an industrial automation context. As shown in FIG. 4, the private network 202 includes multiple workstations, including a primary workstation 302 and one or more secondary workstations 304. The workstations 302, 304 may include, for example, personal computers, desktop computers, laptop computers, tablets, mobile devices, specialty computers, such as a human-machine interface (HMI), or any other computer device, and may be considered nodes of the private network 202. Each of the workstations 302, 304 may be connected to one or more devices 306, which may include industrial automation controllers, industrial automation drives, actuators, sensors, circuit breakers, input/output (I/O) systems, networking equipment, power supplies, power converters, and the like. In some embodiments, the workstations 302, 304 may provide data to the devices 306 that controls the devices 306 or otherwise specifies one or more operational characteristics of connected devices 306. The devices 306 may provide artifacts 308 (e.g., operational data) to connected workstations 302, 304, which the workstations 302, 304 store in a local database 310. The artifacts 308 may include data regarding activities performed by the devices 306, as well as algorithms, engines, software features, etc. utilized by the devices 306.

Each workstation 302, 304 includes a telemetry pipeline agent (TPA) 312 that analyzes received artifacts 308 and generates a data delta set, which represents a change in the artifacts 308 by comparing the received artifacts 308 to one or more previous artifacts 308. The data delta for each workstation 302, 304 may be stored in the respective local database 310 of the workstation 302, 304 (e.g., in a data delta folder). The local TPAs of the secondary workstations 304 aggregate the data delta, encrypt the data delta, and periodically transmit encrypted aggregated data delta to the TPA 312 of the primary workstation 302 via a delta exchange protocol. Transmitting data delta sets, rather than complete data sets helps to reduce network traffic and increase transmission speeds. As an additional security measure, workstations 302, 304 may be configured to identify and log attempts to edit or otherwise tamper with artifacts or other software asset data. In some embodiments, attempts to tamper with artifacts or other software asset data may invalidate licenses and cause the associated software assets to be disabled and/or rendered inoperable. As illustrated in FIG. 4, TPA application programming interfaces (APIs) 314 may be used to access and specify various aspects of the TPAs, such as rates of transmission, frequency of transmission, timing of transmission, reporting (e.g., via trace logs), and so forth. The TPA 312 of the primary workstation 302 receives the various sets of data delta from the TPAs of the secondary workstations 304, synchronizes the data delta to remove redundant entries, consolidates the data delta into a single representation of the data delta for the whole industrial automation system 10 and stores the consolidated data delta representation in a local data delta store 316, which may or may not be within the local database 310 of the primary workstation 302. The TPA 312 of the primary workstation 302 periodically uploads the single representation of the delta for the industrial automation system 10 to the remote server 30. As previously discussed, the TPA 312 of the primary workstation may be accessed via an API 314 to specify various aspects of the TPA, such as rates of transmission, frequency of transmission, timing of transmission, reporting (e.g., via trace logs), and so forth. Based on data delta uploaded to the remote server, a software/service provider may determine what software/services were used and how much, whether the software/services used falls below, within, or above limits specified by existing licenses, whether additional licenses are needed, true up costs, whether any existing licenses are being under used or not used at all, and so forth.

Figure 5:
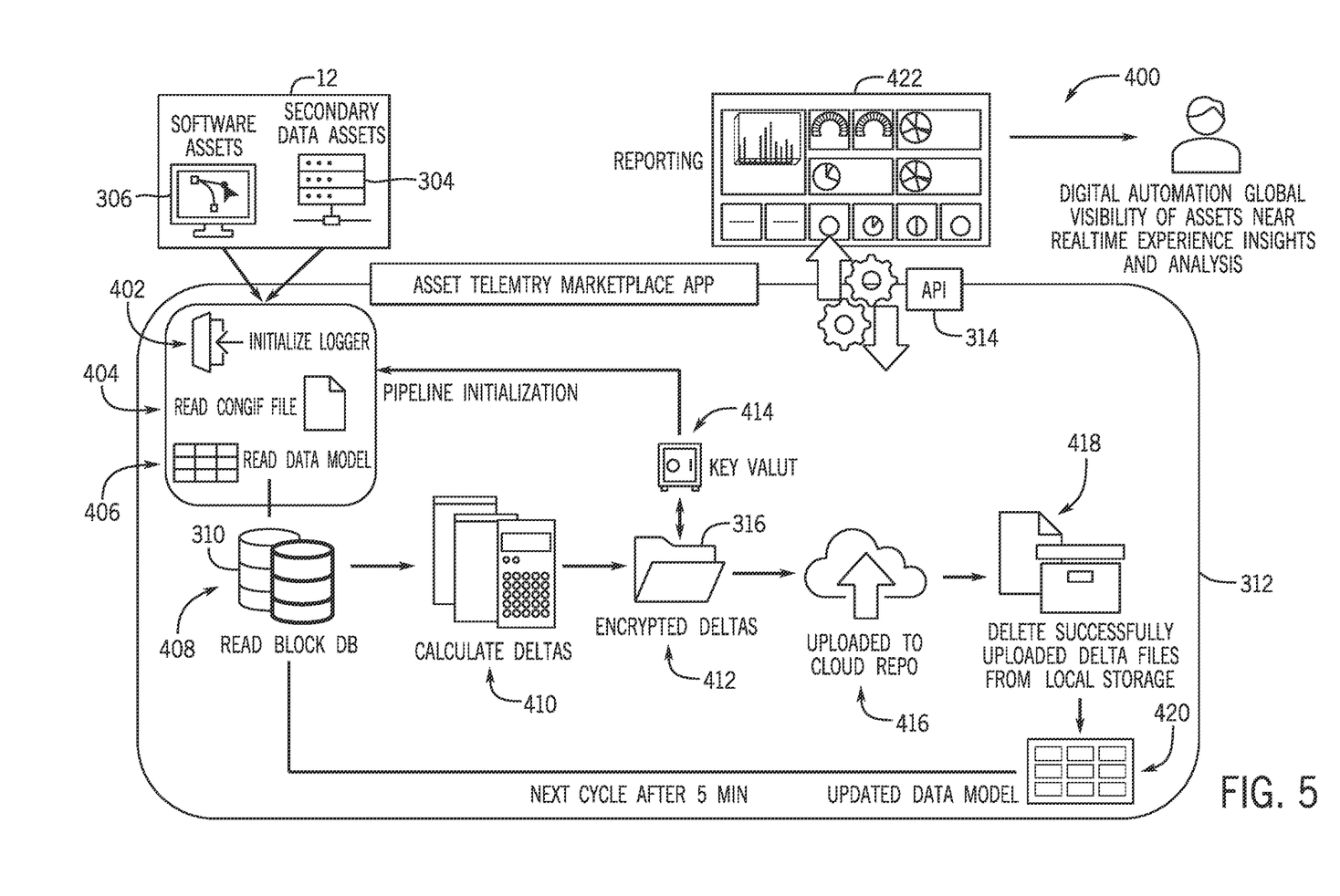
FIG. 5 illustrates a flow diagram of activities performed by the TPA of the primary node of FIG. 4, in accordance with aspects of the present disclosure.

FIG. 5 is a flow diagram 400 illustrating activities of a TPA 312 of a primary node 302. As previously described, the TPA 312 receives artifacts from connected software assets (e.g., software assets running on devices) and receives data delta from secondary data assets (e.g., TPAs 312 of one or more secondary nodes 304). At 402, the TPA 312 initializes a logger script to read and log the received data. At 404, the TPA 312 reads a config file that defines various aspects of how the logger script is run. At 406, the TPA 312 reads the data model for the received data, which may be stored in the local database 310. At 408, the TPA 312 reads the previous data set from the local database 310 so the received data can be compared to the existing data. At 410, the TPA 312 calculates data deltas by comparing the newly received data to the previous data that was stored in the local database 310. At 412, the calculated data deltas are encrypted using a key (e.g., via public or private encryption key), which is securely stored in a key vault 414. At 416, the encrypted data delta values are uploaded to a cloud repository. At 418 the successfully uploaded delta files are deleted from the local storage and at 420 the data model is updated based on the data delta values such that old data delta values are deleted and only current data delta values persist in an encrypted form. The cycle begins again after a set period of time or some triggering event. As previously discussed, the TPA 312 may be interact with other components and/or be accessible via the API 314. For example, the API 314 may facilitating reporting various aspects of software asset licensing and usage to the customer, to the software/service provider, or to some other party (e.g., via a dashboard 422 that is available as part of a software asset licensing and usage application that allows users to view software usage and manage licenses).

Though the flow diagram 400 of FIG. 5 is for a TPA 312 of a primary node 302, it should be understood that the TPAs 312 of the secondary nodes 304 may perform similar activities. For example, rather than receiving data deltas from TPAs 312 of one or more secondary nodes 304, the TPAs 312 of the secondary nodes 304 may receive data regarding software asset usage from one or more connected devices. Further, rather than uploading encrypted data deltas to the cloud, the TPAs 312 of the secondary nodes 304 determine data deltas based on the data regarding software asset usage received from the one or more connected devices and transmit the data deltas to the TPA 312 of a primary node 302.

Figure 6:
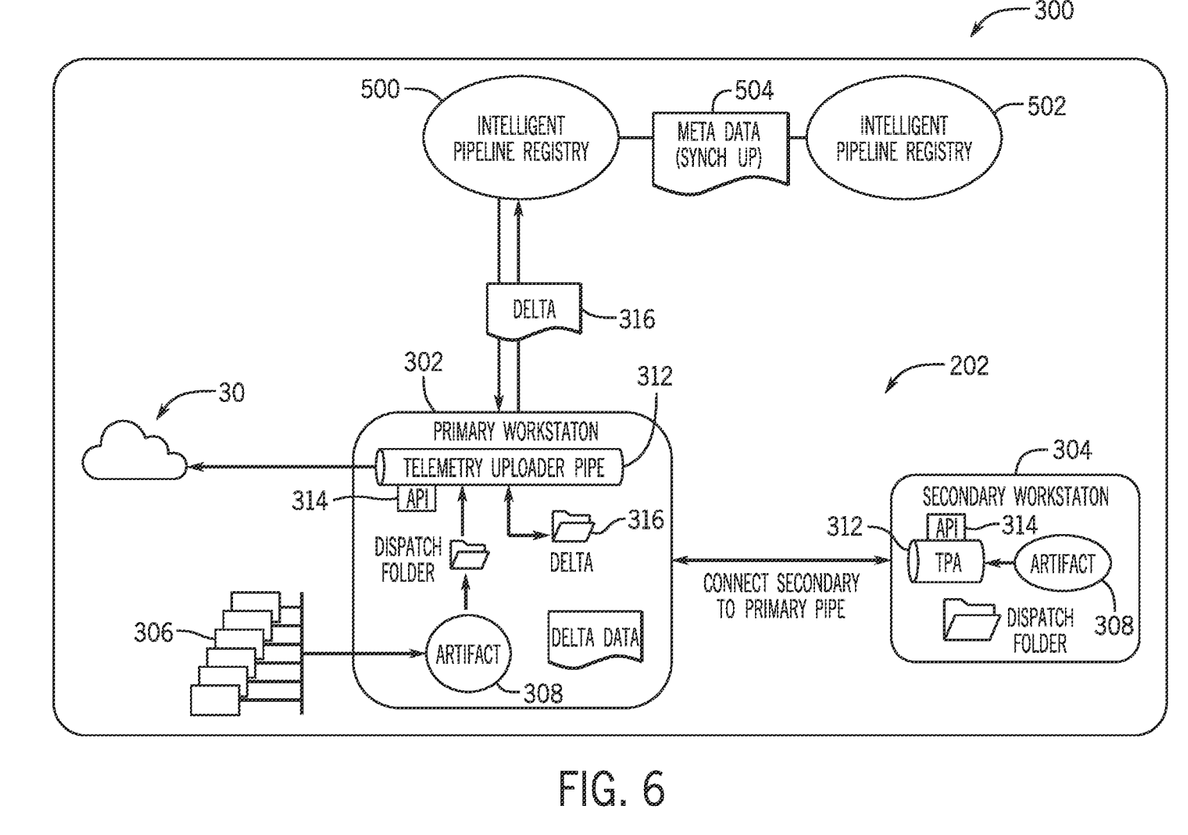
FIG. 6 illustrates a schematic of the network topology of FIG. 4 having a primary registry and a backup registry, in accordance with aspects of the present disclosure.

Returning to FIG. 4, the network topology 300 may be self-healing in that the components within the network topology 300 may recognize when one or more other components within the network have failed and make adjustments to maintain the flow of software telemetry data. FIG. 6 is a schematic of the network topology 300 of FIG. 4 illustrating a pipeline registry 500 used to facilitate self-healing capabilities of the network topology 300. The pipeline registry 500 is a database that stores information about the nodes 302, 304, devices 306, and software (represented by artifacts 308) running on the private network 202. All nodes 302, 304 of the private network 202 that have internet access (continuous, periodic, intermittent, etc.) register with the registry 500. Of the registered nodes 302, 304, one is selected to assume the role of the primary node 302 and the remaining nodes assume the role of secondary nodes 304. Selection of the primary node 302 may be by a user/administrator, based on characteristics of the primary node's 302 internet access, based on the primary node's 302 location within the network topology 300, or some other factor. After the primary node 302 has been selected, the internet access for the secondary nodes 304 is disabled. For example, the secondary nodes 304 may be able to communicate with devices within the private network 202, but unable to communicate with devices outside of the private network 202. Accordingly, as described with regard to FIG. 4, the secondary nodes 304 communicate encrypted data deltas to the primary node 302, which consolidates the data deltas received from the secondary nodes 304 and uploads the consolidated data delta from a dispatch folder to the remote server 30. Accordingly, the primary node 302 is the only node that communicates with the remote server 30.

As data is received and processed by the primary node 302, the primary node 302 may transmit data to the pipeline registry 500 to keep the pipeline registry 500 up to date with the network topology 300. In some embodiments the pipeline registry 500 may be stored on the primary node 302. In some embodiments, the pipeline registry 500 may be stored on a central control node, which may or may not be the same node as the primary node, that provide instructions to the various nodes within the private network 202 to perform various activities. In other embodiments, the pipeline registry 500 may be stored on some other node, such as another workstation, an edge device, a server, etc. The network topology may also maintain a backup copy of the pipeline registry 502. In the present embodiment, the backup copy of the pipeline registry 502 is stored on a different node than the pipeline registry 500, however, embodiments are envisaged in which the backup copy of the pipeline registry 502 is stored on the same node as the pipeline registry 500. In such embodiments, the backup copy of the pipeline registry 502 and the pipeline registry 500 may be maintained by different processing cores of the same node, stored in different partitions of a memory, or some other configuration. Accordingly, metadata 504 may periodically be exchanged to synchronize the pipeline registry 500 and the backup copy of the pipeline registry 502 such that the two registries 500, 502 match. In the event of a failure of the pipeline registry 500, the backup copy of the pipeline registry 502 may be transitioned to the primary pipeline registry. Accordingly, the pipeline registry 500 may be transitioned to become a backup registry, or a copy of the backup pipeline registry 502 may be generated to serve as a backup registry.

Figure 7:
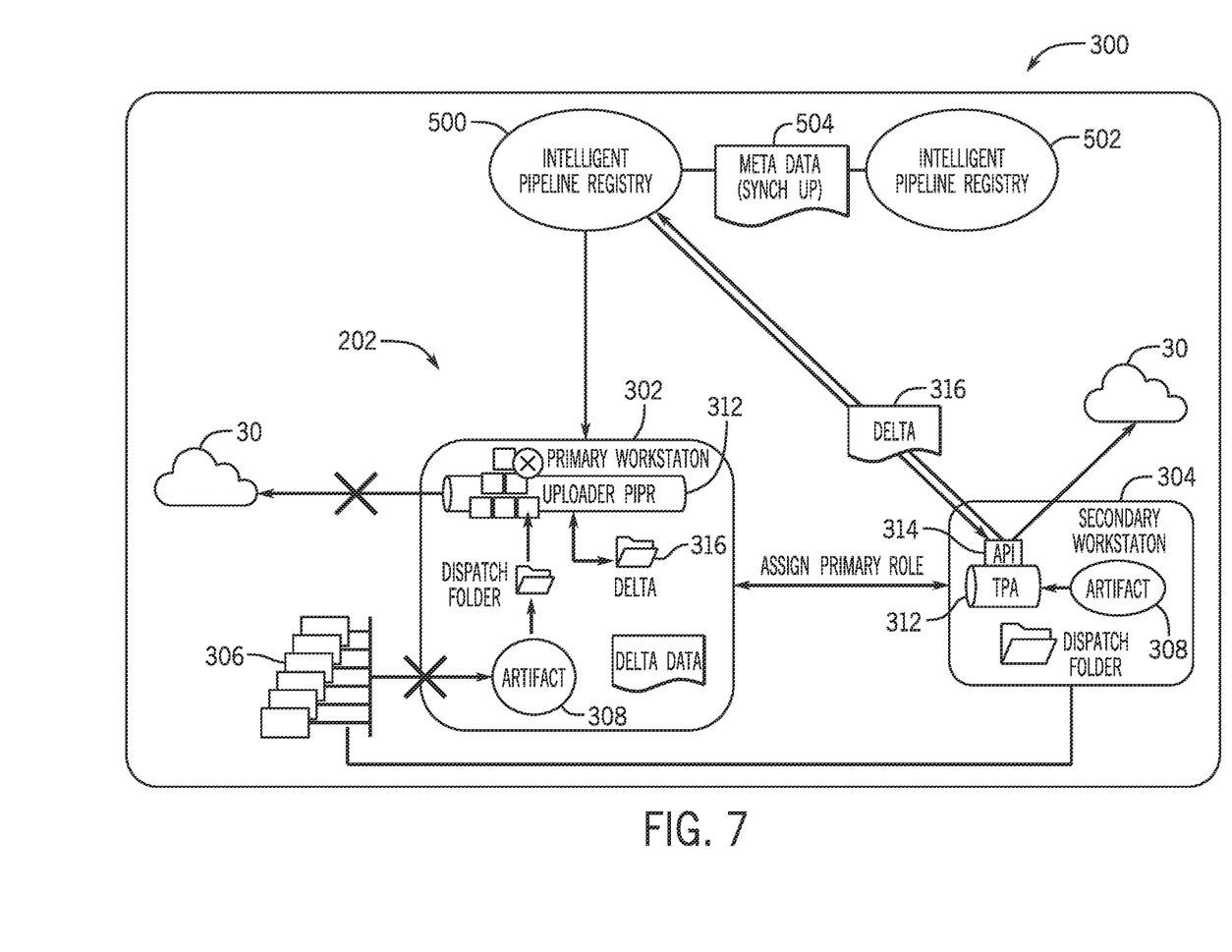
FIG. 7 illustrates a schematic of self-healing capabilities of the network topology of FIG. 6 when the primary node fails, in accordance with aspects of the present disclosure.

FIG. 7 is a schematic of the network topology 300 of FIG. 6 illustrating self-healing capabilities of the network topology 300 when the primary node 302 fails. When the primary node 302 fails, because of a lost internet connection, fatal node error, node goes unresponsive, etc., the next available secondary node 304 with an internet connection is selected, assigned the role of primary node, and the node's 304 internet connection is enabled. The pipeline registry 500 is reconfigured to shift node 304 from a secondary node into the role of primary node and shift node 302 from a primary node to the role of secondary node, thus enabling the node 304 to communicate with and update the registry 500. The registry 500 transmits the most recent data delta received from the old primary node 302 to the new primary node 304. The TPAs of the other secondary nodes are instructed to send data deltas to node 304 rather than node 302. The activity described with regard to FIGS. 4-6 is resumed, but with node 304 acting as the primary node instead of node 302. If a subnet fails to establish a new primary nope 302, the subnet fails over to Air Gapped mode until a primary node 302 can initiated or connectivity to other subnet with a primary node 302 can be found. In some embodiments, the failover operations depicted in FIG. 7 may be performed by, controlled by, or otherwise orchestrated by a central control node, which may or may not run be the node on which one or both of the registries are hosted. For example, the control node may provide instructions to one or more nodes within the private network 202 to perform various functions.

Figure 8:
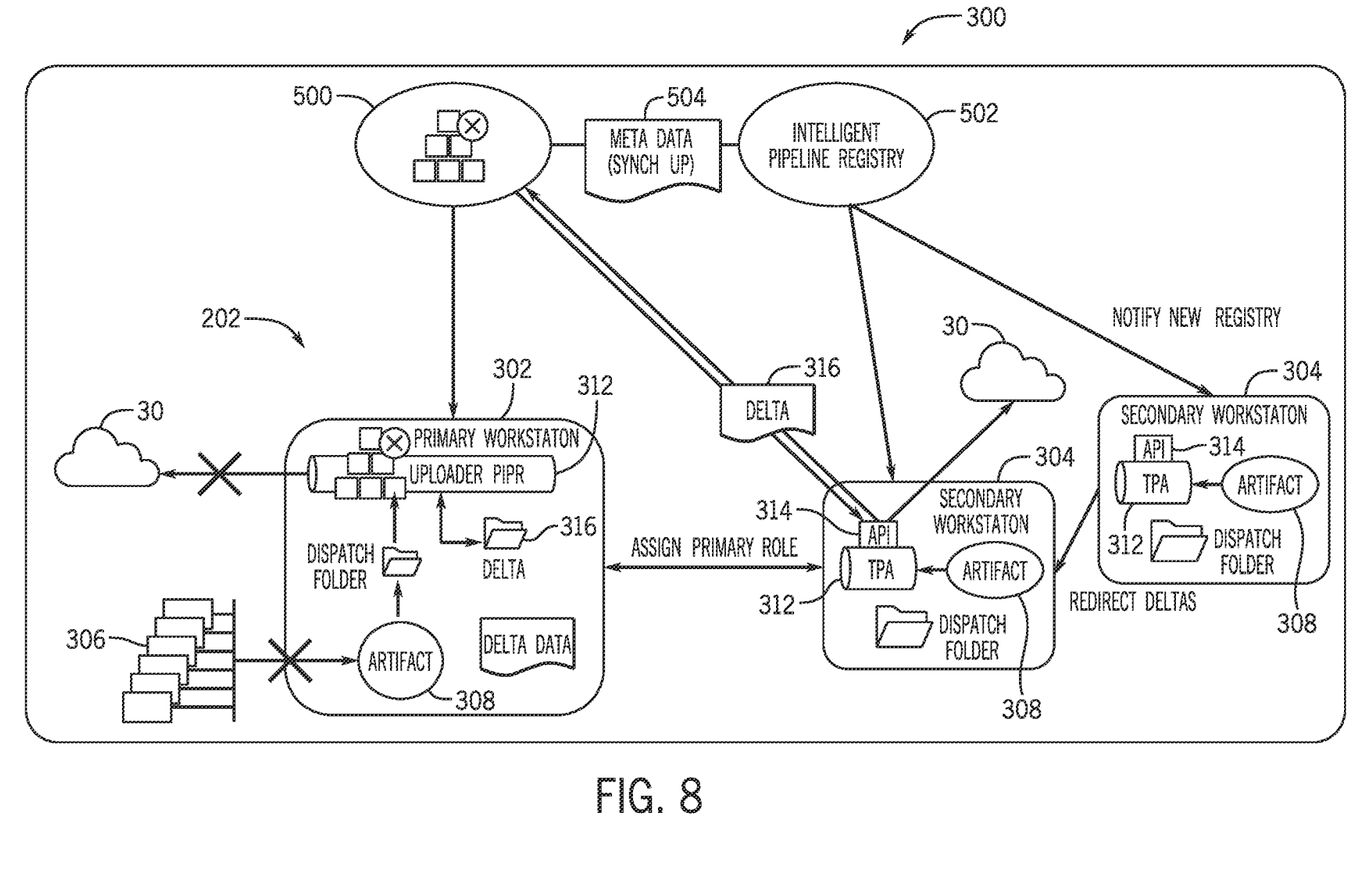
FIG. 8 illustrates a schematic of self-healing capabilities of the network topology of FIG. 6 when the primary node and the primary registry fail, in accordance with aspects of the present disclosure.

FIG. 8 is a schematic of the network topology 300 of FIG. 6 illustrating self-healing capabilities of the network topology 300 when the primary node 302 and the pipeline registry 500 fail. Failure of the primary node 302 and the pipeline registry 500 may occur, for example, if the pipeline registry 500 is stored on the primary node 302, if the pipeline registry 500 is stored on the same server or computing device as the primary node 302 and that server or device fails. Further, the pipeline registry 500 may be stored on a different device form the primary node 302, but in close physical proximity such that a fire, water leak, loss of power, etc. may cause both devices to fail. As with the primary node failure discussed with regard to FIG. 7, the next available secondary node 304 with an internet connection is selected, and the role of primary node is transferred to node 304. Further, the backup pipeline registry 502 is transitioned to the role of primary pipeline registry and reconfigured to reflect the change in roles of the nodes 302, 304. The registry 502 transmits the most recent set of data delta received from the old primary node 302 to the new primary node 304. The registry 502 also notifies the TPAs of the other secondary nodes that the formerly backup registry 502 is now the primary registry and instructs the TPAs of the secondary nodes to send data deltas to node 304 rather than node 302. The activity described with regard to FIGS. 4-6 is resumed, but with node 304 acting as the primary node instead of node 302, and registry 502 acting as the primary registry instead of registry 500. As discussed above with respect to FIG. 7, in some embodiments, the failover operations depicted in FIG. 8 may be performed by, controlled by, or otherwise orchestrated by a central control node, which may or may not run be the node on which one or both of the registries are hosted. For example, the control node may provide instructions to one or more nodes within the private network 202 to perform various functions.

For example, a secondary node 304 may assume the role of primary node, have its internet connection enabled, and receive data deltas from TPAs of other secondary nodes 304. The node 304 may then consolidate the received data deltas for the industrial automation system and transmit the data deltas to the remote server. Correspondingly, after the shift in the role of primary node from the primary node 302 to the secondary node 304, secondary nodes 304 that remain secondary nodes continue as normal, but redirect their data delta transmissions from the TPA of the old primary node 302 to the TPA of the new primary node 304.

The present disclosure includes techniques for tracking software asset usage and managing software licenses for an industrial automation system. The industrial automation system may be disposed within a private network and may include multiple nodes having internet connections. A first node may be assigned a role of primary node, while the remaining nodes may be assigned the role of secondary node. The internet connection of the primary node may be enabled, while the internet connections of the secondary nodes may be disabled. The secondary nodes collect software artifacts representative of usage of software assets by connected industrial automation devices. Telemetry pipeline agents (TPAs) of the secondary nodes determine a data delta that represents differences between the software artifacts and a previous iteration of the software artifacts and manage a local data delta folder. The TPAs periodically aggregate data delta folders and transmit the data deltas to the TPA of the primary node, which consolidates the received data deltas into a single data delta representation for the entire industrial automation system. The TPA of the primary node then uploads the single data delta representation to a remote server for analysis by the customer and/or software provider.

The network topology described below may be self-healing, in that the system can identify when a node and/or a registry has failed and take corrective action to maintain the flow of telemetry data. For example, if the primary node fails, the role of primary node will be shifted to the next available secondary node with an internet connection. The most recent data delta for the whole system is provided to the new primary node, the TPAs of the secondary nodes are instructed to redirect data deltas to the new primary node, and the process resumes as normal with the new primary node. If the primary registry fails, a backup copy of the registry, which is maintained using synched metadata from the primary registry, is initialized assumed the role of primary registry. All TPAs are notified of the new primary registry and the process resumes as normal with the new primary registry.

Use of the disclosed techniques allows for a reliable and secure way to track software asset usage and manage software licenses for an industrial automation system. Transmitting data deltas, rather than complete data sets, drastically reduces the amount of data being transmitted across the network, resulting in less network traffic and higher transmission speeds. Encrypting data deltas before transmission and deleting already transmitted data deltas helps keep the collected data secure. Further, the self-healing capabilities of the disclosed techniques ensure that tracking software asset usage and managing software licenses can continue even if a device within the private network fails. Accordingly, the disclosed techniques allow an entity to efficiently track its software asset usage by industrial automation systems and manage its software licenses.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A method, comprising:
   instructing a first node to determine a data delta representative of differences between software asset data received from one or more industrial automation devices communicatively coupled to the first node and a previous iteration of the software asset data, wherein the software asset data is representative of usage of one or more software assets by the one or more industrial automation devices, and wherein the one or more industrial automation devices are part of an industrial automation system;
   instructing the first node to encrypt the data delta;
   instructing the first node to transmit the encrypted data delta to a second node that is in a primary node role, wherein the primary node role comprises responsibility to report the software asset data for the industrial automation system;
   instructing the second node to decrypt the data delta;
   instructing the second node to consolidate the decrypted data delta and additional decrypted data deltas received from one or more additional nodes into a consolidated data delta for the industrial automation system;
   instructing the second node to encrypt the consolidated data delta for the industrial automation system;
   instructing the second node to transmit the encrypted consolidated data delta for the industrial automation system to a remote server;
   maintaining a registry configured to store information about a plurality of nodes within a private network, including the first node, the second node, and the one or more additional nodes;
   identifying that the second node has failed;
   shifting the primary node role to the first node;
   enabling a network connection of the first node;
   updating the registry to reflect that the first node is in the primary node role;

transmitting, to the first node, the encrypted consolidated data delta stored in the registry; and notifying the one or more additional nodes that the first node is in the primary node role and instructing the one or more additional nodes to transmit future encrypted data deltas to the first node instead of the second node.

2. The method of claim 1, comprising instructing the second node to receive, from one or more second industrial automation devices communicatively coupled to the second node, second software asset data representative of usage of the one or more software assets by the one or more second industrial automation devices communicatively coupled to the second node.

3. The method of claim 2, wherein the data delta, the additional data deltas, and the consolidated data delta are determined by respective telemetry pipeline agents executing on the first node, the second node, and the one or more additional nodes, wherein the telemetry pipeline agent is accessible via an application programming interface (API).

4. A non-transitory computer readable medium storing instructions that, when executed by processing circuitry, cause the processing circuitry to perform operations comprising:

instructing a first node to determine a data delta representative of differences between software asset data received from one or more industrial automation devices communicatively coupled to the first node and a previous iteration of the software asset data, wherein the software asset data is representative of usage of one or more software assets by the one or more industrial automation devices, and wherein the one or more industrial automation devices are part of an industrial automation system;

instructing the first node to encrypt the data delta;

instructing the first node to transmit the encrypted data delta to a second node that is in a primary node role, wherein the primary node role comprises responsibility to report the software asset data for the industrial automation system;

instructing the second node to decrypt the data delta;

instructing the second node to consolidate the decrypted data delta and additional decrypted data deltas received from one or more additional nodes into a consolidated data delta for the industrial automation system;

instructing the second node to encrypt the consolidated data delta for the industrial automation system;

instructing the second node to transmit the encrypted consolidated data delta for the industrial automation system to a remote server;

maintaining a first registry configured to store information about a plurality of nodes within a private network, including the first node, the second node, and the one or more additional nodes;

maintaining a second registry, wherein the first registry has a primary registry role and the second registry has a backup registry role, wherein the backup registry role signifies that the second registry is not utilized unless the first registry fails;

identifying that the second node and the first registry have failed;

shifting the primary node role to the first node;

transitioning the primary registry role to the second registry;

transmitting, to the first node, the encrypted consolidated data delta stored in the second registry;

notifying the one or more additional nodes that the first node is in the primary node role and that the second registry is in the primary registry role; and instructing the one or more additional nodes to transmit future encrypted data deltas to the first node instead of the second node.

5. The non-transitory computer readable medium of claim 4, wherein the operations comprise instructing the second node to receive, from one or more second industrial automation devices communicatively coupled to the second node, second software asset data representative of usage of the one or more software assets by the one or more second industrial automation devices communicatively coupled to the second node.

6. The non-transitory computer readable medium of claim 5, wherein the data delta, the additional data deltas, and the consolidated data delta are determined by respective telemetry pipeline agents executing on the first node, the second node, and the one or more additional nodes, wherein the telemetry pipeline agent is accessible via an application programming interface (API).

7. A non-transitory computer readable medium storing instructions that, when executed by processing circuitry, cause the processing circuitry to perform operations comprising:

instructing a first node to determine a data delta representative of differences between software asset data received from one or more industrial automation devices communicatively coupled to the first node and a previous iteration of the software asset data, wherein the software asset data is representative of usage of one or more software assets by the one or more industrial automation devices, and wherein the one or more industrial automation devices are part of an industrial automation system;

instructing the first node to encrypt the data delta;

instructing the first node to transmit the encrypted data delta to a second node that is in a primary node role, wherein the primary node role comprises responsibility to report the software asset data for the industrial automation system;

instructing the second node to decrypt the data delta;

instructing the second node to consolidate the decrypted data delta and additional decrypted data deltas received from one or more additional nodes into a consolidated data delta for the industrial automation system;

instructing the second node to encrypt the consolidated data delta for the industrial automation system;

instructing the second node to transmit the encrypted consolidated data delta for the industrial automation system to a remote server identifying an attempt to tamper with the software asset data;

logging the attempt to tamper with the software asset data; and disabling the one or more software assets based on the attempt to tamper with the software asset data.

8. The non-transitory computer readable medium of claim 7, wherein the operations comprise instructing the second node to receive, from one or more second industrial automation devices communicatively coupled to the second node, second software asset data representative of usage of the one or more software assets by the one or more second industrial automation devices communicatively coupled to the second node.

9. The non-transitory computer readable medium of claim 8, wherein the data delta, the additional data deltas, and the consolidated data delta are determined by respective telemetry pipeline agents executing on the first node, the second node, and the one or more additional nodes, wherein the telemetry pipeline agent is accessible via an application programming interface (API).

\* \* \* \* \*